United States Patent [19]

Freitas et al.

[11] Patent Number: 5,602,692

[45] Date of Patent: Feb. 11, 1997

[54] SAMPLED POSITION ERROR SIGNAL DEMODULATION SYSTEM FOR BANDED DATA DISK DRIVES

[75] Inventors: David A. Freitas, Morgan Hill; Shih-Ming Shih, San Jose, both of Calif.

[73] Assignee: International Business Machines Corporation, Armonk, N.Y.

[21] Appl. No.: 320,021

[22] Filed: Oct. 7, 1994

[51] Int. Cl.⁶ .................................................... G11B 5/596
[52] U.S. Cl. .................................. 360/77.08; 360/77.02
[58] Field of Search .......................... 360/77.08, 77.04, 360/77.02

[56] References Cited

U.S. PATENT DOCUMENTS

| | | | |
|---|---|---|---|
| 4,551,776 | 11/1985 | Roalson | 360/77 |
| 4,616,276 | 10/1986 | Workman | 360/77 |
| 4,669,004 | 5/1987 | Moon et al. | 360/77 |
| 4,823,212 | 4/1989 | Knowles et al. | 360/77.08 |
| 4,977,472 | 12/1990 | Volz et al. | 360/78.14 |
| 5,050,016 | 9/1991 | Squires | 360/77.08 |
| 5,089,757 | 2/1992 | Wilson | 360/77.08 X |
| 5,115,359 | 5/1992 | Sidman | 360/77.05 |
| 5,177,651 | 1/1993 | Moraru et al. | 360/77.08 |
| 5,442,499 | 8/1995 | Emori | 360/48 |

FOREIGN PATENT DOCUMENTS 3-280275  12/1991  Japan .................... G11B 21/10

OTHER PUBLICATIONS

W. A. Harrington et al., "Quad-Burst PES System for Disk File Servo," IBM Technical Disclosure Bulletin, vol. 21, No. 2, Jul. 1978, pp. 804–805.

C. C. Liu, "Quad-Burst Servo Pattern," IBM Technical Disclosure Bulletin, vol. 22, No. 12, May 1980, pp. 5436–5438.

E. Mueller, "Digital Demodulator for Quad-Burst Position Error Signal," IBM Technical Disclosure Bulletin, vol. 31, No. 9, Feb. 1989, pp. 159–160.

J. S. Best et al., "Servo Scheme for Integrating Positive Error Signal Detector," IBM Technical Disclosure Bulletin, vol. 32, No. 1, Jun. 1989, pp. 284–285.

S. A. Raghavan, "Fast and Accurate Computation of the Amplitude of Quadrature Pairs," IBM Technical Disclosure Bulletin, vol. 34, No. 4B, Sep. 1991, pp. 46–47.

D. Freitas et al., "Asynchronous Quadrature Burst Position Error Demodulation Technique," IBM Technical Disclosure Bulletin, vol. 34, No. 5, Oct. 1991, pp. 406–407.

*Primary Examiner*—Andrew L. Sniezek
*Assistant Examiner*—Regina Y. Neal
*Attorney, Agent, or Firm*—Baker, Maxham, Jester & Meador

[57] ABSTRACT

A servo signal demodulator for a banded data disk drive system includes a single data sampling clock for both the data channel sampling and the servo data sampling. The demodulator includes an analog-to-digital converter that receives a readback signal from a read/write head of the disk drive system and generates samples of the readback signal in accordance with a repeating sampling clock signal whose frequency changes as a function of a data band of the disk drive over which the read/write head is positioned, an adder that sums the readback signal samples from the analog-to-digital converter to thereby produce an integrated readback signal value, and a servo signal decoder circuit that latches the adder sum to a register after the adder has summed a sufficient number of readback signal samples to comprise a servo burst, in accordance with a data channel sampling clock signal, and provides demodulated signal information to a servo controller.

5 Claims, 9 Drawing Sheets

SAMPLED POSITION ERROR SIGNAL DEMODULATION SYSTEM FOR BANDED DATA DISK DRIVES

BACKGROUND OF THE INVENTION

1. Field of the Invention

This invention relates generally to data storage device servo control systems and, more particularly, to demodulation of servo information for positioning the heads of data storage devices across the surface of a moving storage medium.

2. Description of the Related Art

In conventional computer data storage systems having a rotating storage medium, such as a magnetic or magneto-optical disk, data is stored in a series of concentric or spiral tracks across the surface of the disk. The data comprises a series of variations in disk surface magnetic orientation recorded laterally in the tracks. A magnetic read/write head suspended over the disk surface transduces the variations in magnetic orientation and produces a readback signal. The variations in magnetic orientation, generally comprising reversals of magnetic flux, represent binary digits of ones and zeroes that in turn represent data. The magnetic read/write head detects the variations in magnetic orientation and generates the readback signal as the disk rotates relative to the read/write head at thousands of revolutions per minute.

Reading and recording data in a desired one of the tracks requires knowledge of the read/write head position relative to the desired track as the disk rotates and requires precise centering of the read/write head over the track. Conventionally, the read/write head is mounted on a disk arm that is moved by a servo. A disk drive servo control system controls movement of the arm radially across the disk to move the read/write head from track to track and, once over a selected track, to maintain the head in a path centered over the track in a track-following operation.

A servo control system maintains the read/write head centered over a track by reading servo information from the disk surface. The servo information comprises a pattern of high-frequency magnetic flux transitions, generally flux reversals, that are pre-recorded in the tracks at the time of disk manufacture. A servo read head, which can be either the same head used for reading the binary data or can be a dedicated servo head, transduces the servo information and produces a servo signal. The servo signal includes a digital portion that provides the number of the track from which the servo pattern was read and an analog portion. The analog servo signal is a signal the magnitude of which indicates the position of the read/write head relative to the track centerline. The analog signal is used to generate a position error signal and thereby control the disk arm servo. Thus, the servo control system detects the track over which the read/write head is positioned and controls movement of the head relative to the track.

A common method for providing servo information to a disk servo control system is known as the sector servo method. In the sector servo method, each disk surface of a disk drive includes both servo information and binary data within a single track. The tracks on a sector servo disk surface are divided into radial sectors comprising short servo information fields interspersed among data fields. Each servo information field includes a sector marker, which indicates to the read/write head that servo information immediately follows in the track, a track identification number, and a high-frequency servo burst pattern. The sector servo method advantageously provides design efficiencies in that a single read/write head is used to read the servo information and also to read and record data from the disk. In addition, less of the total disk surface area is used for servo information as compared with other designs, such as those using a dedicated servo head. In this way, the sector servo method increases the storage media surface area available for recording data.

The servo burst portion of the head readback signal is used to generate a corrective position error signal (PES) to cause a head positioning servo to move and control the position of the read/write head over the disk. The PES provides an indication of the direction and extent of read/write head movement required to maintain the head centered about the track. Servo patterns vary depending on the manufacturer and the system. For example, in one system a first group of transitions comprises a first servo pattern burst and a second group of transitions comprises a second servo pattern burst. The PES is produced, or demodulated, from the servo bursts by determining the magnitude of each burst and then determining the amplitude difference of the first and second burst magnitudes. If the amplitude difference is zero, then the read/write head is positioned exactly over the track centerline. A positive amplitude difference indicates that the head is off center in one direction and a negative amplitude difference indicates that the head is off center in the opposite direction. Other patterns generate four servo bursts that comprise a quadrature PES.

With conventional digital sampled servo signal demodulation systems, the analog servo signal must be digitized before being provided to a servo signal digital processor. An analog servo demodulator resides in a data channel chip module that processes the head readback signal. In a typical sector servo system with quadrature PES, the analog servo demodulator produces four analog PES voltages that are provided to an off-chip analog-to-digital converter that digitizes the quadrature signals and provides them to the servo signal digital processor. Conventional synchronous data channel architectures already contain a high-speed flash analog-to-digital (A/D) converter internally in the data channel chip module. The flash A/D converter is also known as a parallel-comparator A/D converter. The data channel flash A/D converter samples the data portion of the head readback signal according to a predetermined sampling clock and produces a digitized signal for data channel processing. Flash A/D converters are relatively complex and costly but provide the performance necessary for high-speed data channel architectures. It would be advantageous to use the internal flash A/D converter of the data channel and the associated high-speed logic to demodulate and digitize the servo signal as well as the data information, thereby eliminating additional expense and complexity of dedicated analog PES demodulators and off-chip servo signal A/D converters.

Conventionally, sector servo demodulation circuits that demodulate and digitize the servo signal with the data channel flash A/D converter use architectures that require the sampling rate of the converter during servo signal processing to be an integer multiple of the fundamental frequency of the servo burst pattern. For example, if a quadrature servo pattern contains four 5.0 MHz flux transition burst cycles, then the A/D converter sampling rate would be 40 MHz to obtain eight samples per burst cycle. The servo burst pattern frequency remains constant over the entire disk surface. Therefore, the sampling rate for digitizing the servo signal must remain constant over the entire disk surface for proper processing of the servo information.

Many disk storage devices are of a banded data format. On a disk with banded data, the frequency of the recorded magnetic flux transitions that comprise the binary data will be changed depending on the radial distance of the read/write head from the disk outside diameter, or disk circumference. In particular, the recording frequency of the transitions in terms of disk revolutions is greater toward the disk circumference as compared to the recording frequency toward the disk center. For example, approximately six data bands typically are distributed across the surface of a standard size 3½ inch floppy diskette. Data is recorded in each data band at a different frequency from adjacent bands to permit the number of data bits per linear distance in a track to be maintained at a relatively high value regardless of the track distance from the disk center. It should be apparent that there is more total surface area in a track at the disk circumference than at the disk center and that more data can be recorded per disk revolution at the disk circumference than at the disk center. The use of banded data disk storage systems has become more common as users demand greater storage capacities from disk systems.

In a data storage disk having banded data, the frequency of the sampling clock of the data channel flash A/D converter must change with each different data band. A data channel clock synthesizer generates the proper sampling clock frequency as a function of each data band. Identification of the data band can be obtained from the sector servo fields. Because the servo burst pattern frequency is maintained constant over the entire disk surface, the source for the sampling clock of the servo signal cannot come directly from the data channel A/D converter clock synthesizer. Therefore, banded data disks in which a single flash A/D converter is shared between the data channel and servo signal demodulator generally require the servo signal sampling clock signal to come from an external source that must be switched in to the flash A/D converter when the read/write head is reading the sector servo data field. The necessity of a separate clock generation circuit adds another frequency source to the data channel chip module, increasing complexity and cost of the module.

From the discussion above, it should be apparent that there is a need for a sampled servo signal demodulation system for banded disk drives that permits a data channel flash A/D converter to be used for both data channel decoding and servo signal demodulation without need for separate sampling clock circuits nor for switching between such clock signal sources. The present invention satisfies this need.

SUMMARY OF THE INVENTION

In accordance with the invention, a sampled servo signal demodulation system for a banded data disk drive uses a single data sampling clock for both the data channel sampling and the servo signal sampling. The servo signal samples are demodulated by rectifying the servo signal and integrating the rectified samples over a predetermined time interval. The number of servo signal samples to be integrated is adjusted depending on the frequency of the sampling clock to maintain a constant integration interval as a function of the data channel sample clock frequency. In this way, the system demodulates and digitizes the servo information without requiring a separate, independent clock signal for the servo function and permits a data channel flash A/D converter to be used for both data channel and servo demodulation processing without need for separate sampling clock sources nor for switching between such sources, thereby simplifying the demodulation design and reducing cost.

A disk drive demodulation system constructed in accordance with the invention for demodulating a servo signal having multiple servo bursts includes, for example, an analog-to-digital converter that receives a readback signal from a read/write head of the disk drive and generates samples of the readback signal for data detection and servo demodulation in accordance with a repeating data channel sample clock signal, whose frequency changes as a function of the disk drive data band over which the read/write head is positioned. The demodulation system also includes an adder that sums the signal samples from the analog-to-digital converter to thereby produce an integrated readback signal value for each servo burst, and also could include a servo signal demodulation circuit that latches the adder output to a register after the adder has summed the proper number of signal samples in accordance with the sample clock signal. The demodulation circuit then resets the adder for the next servo burst and provides demodulated servo signal information to a servo controller that controls the position of the read/write head.

In one aspect of the invention, the sampling clock signal is the data channel clock synthesizer output signal, which is generated internally in the data channel chip module and the number of servo signal data samples for integration is selected to best match the required integration time at the same time the frequency of the data channel clock synthesizer is selected. Another aspect of the invention, the accumulated servo signal sample values are normalized to eliminate magnitude variations due to the changing number of servo signal samples over which integration occurs. Finally, an integration window is defined in which the magnitude of the servo samples is adjusted to reduce jitter errors.

Other features and advantages of the present invention should be apparent from the following description of the preferred embodiment, which illustrates, by way of example, the principles of the invention.

DESCRIPTION OF THE PREFERRED EMBODIMENT

Figure 1:
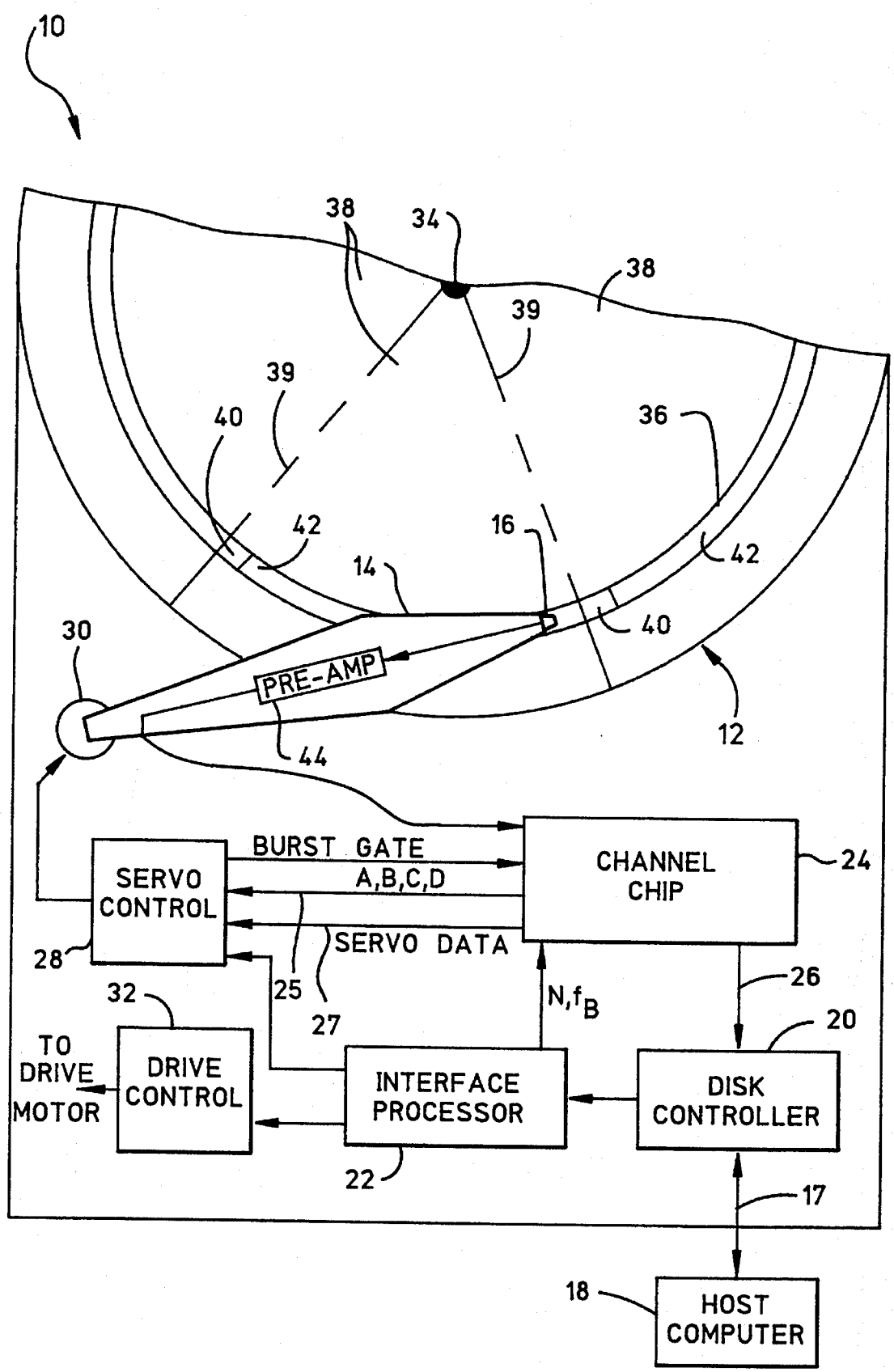
FIG. 1 is a schematic representation and block diagram of a disk drive storage system constructed in accordance with the present invention.

FIG. 1 illustrates a banded data, sector servo disk drive 10 having a servo control system constructed in accordance with the present invention. The disk drive includes a disk 12 and a disk arm 14 that is moved radially across the disk as data is read and recorded from the disk by a read/write head 16. The disk drive is connected through a data channel 17 to a host computer 18 that sends requests for reading and recording data on the disk to a disk controller 20, which in turn communicates with an interface processor 22. A channel chip 24 contains digital detection and decoding circuitry, described further below, that receives an analog readback signal from the head 16 and either detects servo information in the signal or decodes recorded data. The channel chip obtains samples of the readback signal for the data channel with a sampling clock whose frequency changes as the position of the head changes across the disk to match the frequency with which the data was recorded. In accordance with the present invention, the channel chip 24 detects and digitizes the servo information using the data channel sampling clock by integrating servo information samples and by changing the number of integration samples to maintain a constant integration interval, regardless of the sampling clock frequency. Thus, servo information is demodulated and digitized without a separate, independent clock signal for the servo function and without switching between a data channel clock and a servo clock.

After the readback signal generated by the read/write head 16 is provided to the channel chip 24, which processes the signal, the channel chip provides data values to the disk controller 20 over a data output line 26. The disk controller directs the data values to the data channel bus 17 for data processing and provides data information to the interface processor 22. The channel chip demodulates the servo information in the readback signal and provides quadrature servo position information designated A, B, C, and D to a servo control circuit 28 over an output line 25. The servo controller includes micro code and a processor that produces a $PES_P$ signal comprising an A–B difference term and a $PES_Q$ signal comprising a C–D difference term and then produces a PES value from which a servo control signal is generated. The servo control circuit uses the servo control signal to control a servo 30, which moves the disk arm 14. The interface processor 22 provides servo movement signals to the servo control circuit for moving the arm across tracks and provides motor control signals to a drive control circuit 32. The drive control circuit controls a drive motor 34, which controls rotation of the disk 12.

The servo information read by the read/write head 16 is recorded in tracks across the disk 12. In FIG. 1, a pair of circular, parallel lines designates a single servo track 36 of the disk. Only one servo track is shown in FIG. 1 for clarity and simplicity of illustration. A single servo track can include several repeated cycles of a servo pattern and can encompass multiple tracks of data. FIG. 1 diagrammatically shows that the disk 12 is divided into sectors 38, whose boundaries are represented in the illustration by radial lines 39. FIG. 1 also shows that each track 36 includes a servo information field 40 followed by a data field 42. The analog readback signal generated by the read/write head 16 when it reads the track comprises data channel information when the head is over a data field 42 and comprises servo burst information when it is over a servo information field 40.

As the disk 12 is rotated relative to the magnetic read/write head 16, the head transduces the information recorded in the tracks and the servo control system moves the head from track to track in a seek operation and maintains the head centered over a desired track in a track following operation. That is, the head reads servo information recorded on the disk surface at the time of disk manufacture by detecting changes in magnetic flux and generating appropriate signals. The interface processor 22 receives disk movement requests from the disk controller 20, from which the interface processor determines the present track and destination track. The interface processor then determines the proper sampling clock frequency $f_B$ for the destination track, determines the proper number of integration samples N for the servo information, and provides the values to the channel chip 24. The channel chip provides servo data to the servo control circuit 28 over a readback output 27 and receives a Burst Gate signal from the servo control circuit. The channel chip uses the Burst Gate signal to determine the number of samples in the servo sample integration window.

Figure 2:
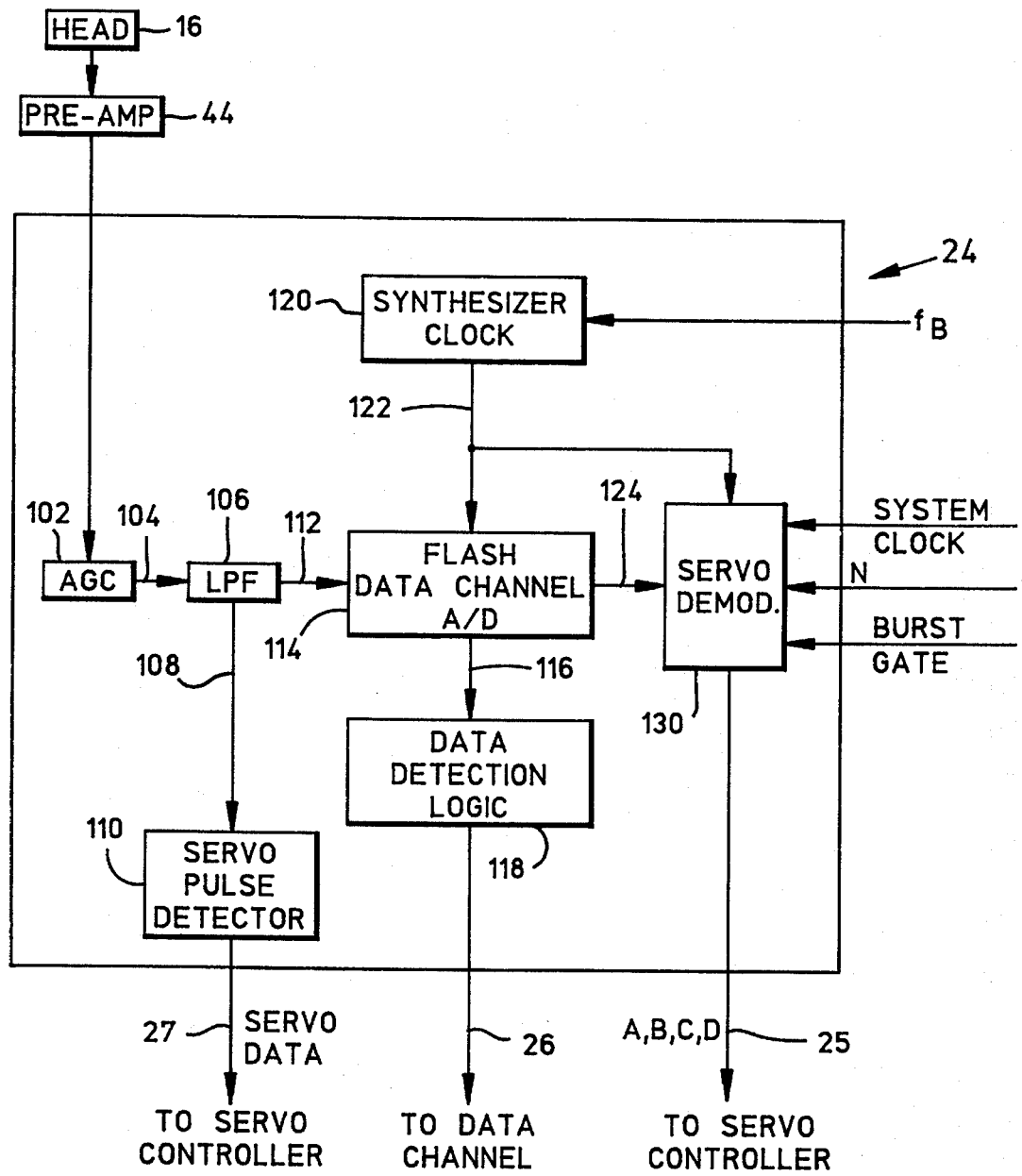
FIG. 2 is a block diagram of the channel chip illustrated in FIG. 1.

FIG. 2 illustrates details of the channel chip 24. More particularly, the read/write head 16 generates a readback signal that is processed by a preamplifier 44, which is mounted on the disk arm 14 (FIG. 1), for amplification. The preamplifier output is provided to an automatic gain control (AGC) circuit 102 that adjusts the gain applied to the signal to maintain the signal amplitude within a range that is predetermined to simplify information processing, reduce noise, and improve system linearity. The amplified signal from the AGC circuit is provided over an AGC output line 104 to a filter 106 that preferably is implemented as a low-pass filter (LPF). The output of the filter is provided over a first output line 108 to a servo pulse detector 110, which detects a servo burst field in the readback signal that indicates the beginning of a servo burst. The filter output also is provided over a second output line 112 to a data channel flash analog-to-digital (A/D) converter 114, which is commonly used in conventional data disk drives for decoding recorded data.

The output of the flash A/D converter 114 is provided over a data output line 116 to a conventional data detection logic circuit 118 that decodes the data from the readback signal and provides it to the disk controller 20 and then to the data channel 17. Because the disk 12 (FIG. 1) is formatted as a banded data disk, the channel chip 24 includes a programmable synthesizer clock 120 that generates a sampling clock signal provided over a clock output line 122 to the data channel flash A/D converter 114 for matching the sampling frequency of the A/D converter to the data bit frequency of the readback signal. In the preferred embodiment, for example, the sampling clock frequency for the recorded data varies between 80 MHz and 130 MHz. The synthesizer clock 120 sets its clock signal using the $f_B$ value it receives from the interface processor. In this way, the readback signal is sampled at the frequency necessary to correctly detect data recorded in each of the frequency bands of the disk.

The output of the flash A/D converter 114 also is provided over a servo output line 124 to a servo demodulator 130, which also receives the sampling clock signal from the synthesizer 120. The servo demodulator demodulates and digitizes the servo information of the readback signal using a signal processing technique known as area demodulation. The area demodulation technique first calls for full-wave rectification of the servo information signal, followed by integration of the rectified signal for a predetermined time interval. In the preferred embodiment, rectification of the signal is accomplished by removing the sign bit from the signal samples received from the flash A/D converter 114. Integration of the rectified signal is accomplished by accumulating the sample magnitudes over the predetermined time interval.

Figure 3:
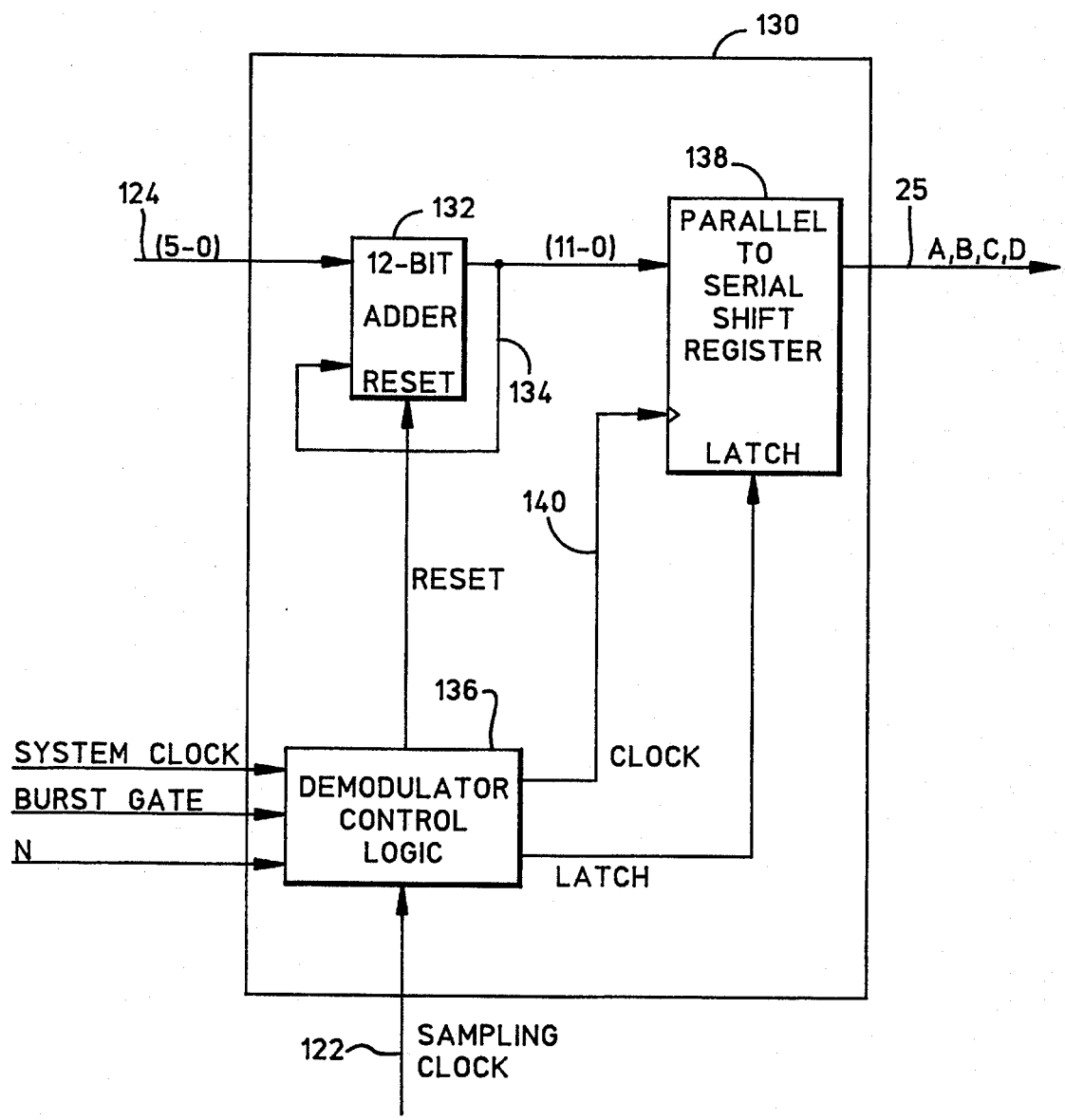
FIG. 3 is a block diagram of the servo signal control system illustrated in FIG. 1.

FIG. 3 is a block diagram of the servo demodulator 130, showing that the demodulator receives output of the flash A/D converter 114 over the converter output line 124. As indicated in FIG. 3, in the preferred embodiment, the converter output comprises six bits designated by (5-0) that are provided to a 12-bit adder 132. The sample magnitudes are summed in the adder, as indicated by an output feedback line 134 that shows return of input back to the adder. Internally, the adder sums rectified samples by removing the sign bit and summing 5-bit sample values. The adder output comprises a maximum of twelve bits designated by (11-0). Those skilled in the art will appreciate that different bit word sizes could be used without departing from the teachings of the invention.

In using the area demodulation technique, the integration time, which is the time interval over which readback signal samples are summed, must remain constant over all data bands of a disk. More particularly, the integration time must match an integer number of cycles in the servo signal burst pattern to prevent errors such as those due to timing jitter. The demodulator 130 maintains a constant integration time by programming the number of servo burst samples to be summed in each data band of the disk. Because the data channel synthesizer clock frequency is known for each data band, the number of servo information samples from the flash A/D converter to be summed can be selected to best match the desired integration time. For example, the number of servo information samples N to be summed can be calculated by the following equation:

N=(burst cycles/burst frequency)*sampling frequency, where "burst cycles" is the number of burst pattern cycles comprising a single quadrature burst, "burst frequency" is the frequency of the burst patterns, and "sampling frequency" is the frequency of the synthesizer clock. A typical burst frequency is 10 MHz, A quadrature burst can comprise, for example, eight servo signal cycles. As noted above, sampling frequencies typically are the range 80 $MH_z < f_B < 130$ $MH_z$.

The demodulator 130 operates under control of a demodulator control logic circuit 136 that generates a reset signal that is provided to a reset terminal of the adder 132 when the proper number of readback signal samples has been summed to reconstitute one of the quadrature servo signal bursts A, B, C, or D. The beginning of a quadrature servo signal burst is indicated by the Burst Gate signal having a logic high value. The control logic circuit determines the proper number of signal samples by receiving the value N from the interface processor 22 (FIG. 1). With each signal sample summed by the adder 132, the control logic circuit decrements a sample count. When the sample count indicates the proper number of samples have been summed, the control logic circuit latches the output of the adder to a register 138 and then generates the reset signal.

FIG. 3 shows that the output of the adder 132 is provided to a parallel-to-serial shift register 138 for subsequent output to servo processing circuitry. It should be understood that other forms of providing output can be selected, depending on the application, without departing from the teachings of the invention. The shift register 138 operates in conjunction a clock signal generated by the control logic circuit 136 and received over a demodulator clock signal line 140. The control logic circuit generates the clock signal based on a system clock signal that is received from the interface processor (FIG. 1) and the synthesizer frequency $f_B$ also received from the interface processor.

Because the programmed number of servo information samples to be summed, multiplied by the sampling rate, likely will not exactly match the desired number of cycles in the servo information burst pattern, there can be a slight timing error that causes inaccuracy in the servo demodulation. In the preferred embodiment, the timing error is reduced by a "windowing" procedure in which the value of the first few samples and last few samples during an integration interval are gradually tapered in value. Thus, if the magnitude of the samples in the middle of an integration interval are not changed but are left at full value, then the magnitude of the first few samples of the interval are gradually changed from a minimum value to the full value and the last few samples of the interval are gradually changed from the full value to a minimum value. In the preferred embodiment, for example, the first two samples and the last two samples of an integration interval are multiplied by 0.25 and both the third and fourth samples from the start of the interval and third and fourth samples from the end of the interval are multiplied by 0.50, the rest remaining unchanged.

Figure 4:
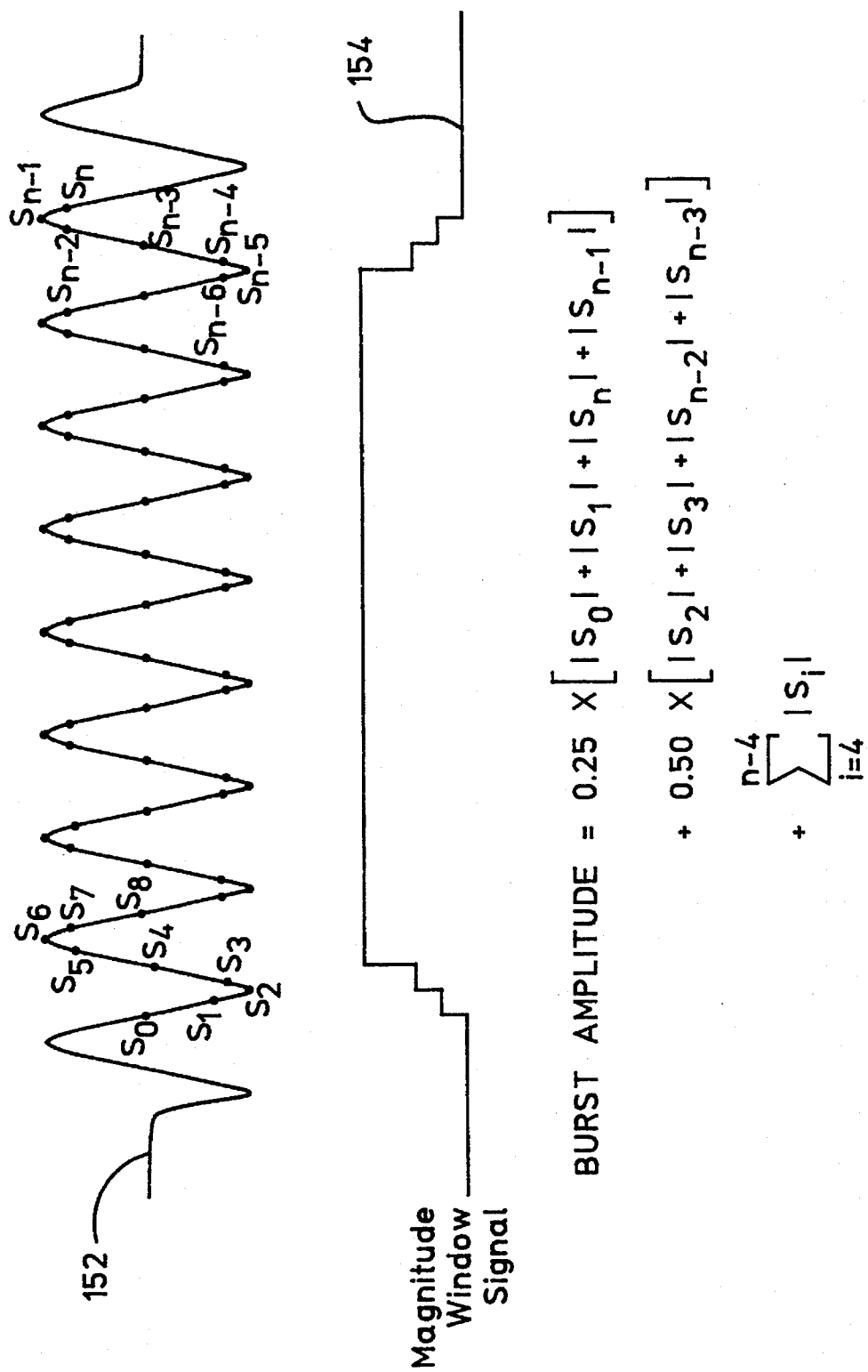
FIG. 4 is a schematic representation of the disk storage media illustrated in FIG. 1, illustrating the banded data and servo sectors.

The windowing of an integration interval is illustrated in FIG. 4, which shows a representation of the servo information readback signal with eight samples per cycle with the first samples of the integration interval represented by $s_0$, $s_1$, $s_2$, ..., $s_7$ and the last samples represented by $S_{n-6}$, $s_{n-5}$, ..., $s_{n-1}$, $s_n$. As depicted in FIG. 4, the burst amplitude is equal to the modified sample values and the sum of the remaining values in the interval. The windowing is graphically represented by the sample magnitude window signal illustrated in FIG. 4.

During a seek operation in which the read/write head 16 is moved from a starting track in a first frequency band to a destination track in a second frequency band, the synthesizer clock will be switched from one frequency to another in accordance with the banded data format. To reduce integration timing errors, the demodulator control logic of the preferred embodiment switches the synthesizer clock at the beginning of the seek operation, immediately following a sector servo information field. The number N of servo information integration samples is changed simultaneously with the change to the synthesizer clock frequency $f_B$.

Figure 5:
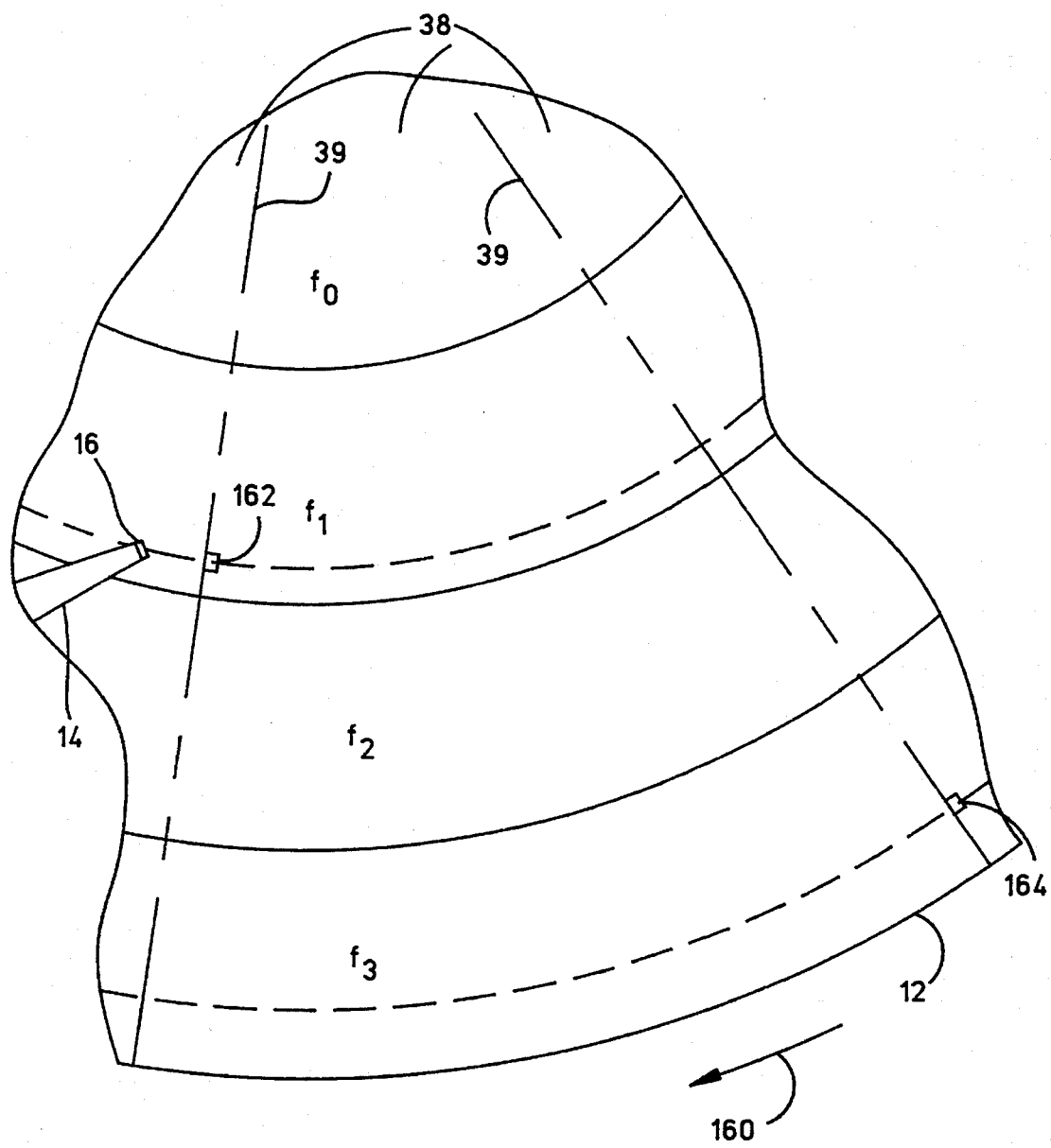
FIG. 5 is a representation of the integration windowing operation provided by the system illustrated in FIG. 1.

The aforementioned aspect of the seek operation is illustrated in FIG. 5, which is a graphical representation of the banded data disk 12 with the read/write head 16 of the disk arm 14 positioned such that the head reads from a track in a first disk data band with data recorded at a data frequency $f_1$ and is to be moved in a seek operation so it reads from a track in a second disk data band with data recorded at a data frequency $f_2$. Disk rotation is in the direction of the arrow 160 and the boundaries between sectors are represented by radial stripes 39. As described above, the seek operation is carried out such that the synthesizer clock frequency $f_B$ and the number of integration samples N in the channel chip processing elements are changed substantially within the time it takes the disk 12 to rotate one servo sector 38.

More particularly, assuming the read/write head 16 is positioned over a sector servo field 162 in the first disk data band when the disk controller generates a seek command, then the interface processor determines the new $f_B$ and N values for the destination second data disk band and provides them to the channel chip in sufficient time such that the new values can be used by the appropriate processing elements to read servo information and demodulate it from a sector servo field 164 in the second disk data band of the next servo sector of the disk. Thus, the new $f_B$ and N values are in place before the next servo sector boundary is encountered by the read/write head. In the preferred embodiment, the interface processor contains memory having predetermined $f_B$ and N values for the banded data disk 12 with which it will operate, in accordance with conventional banded data disk drive techniques.

As the number of servo information samples to be integrated, or summed, is changed with each different data band, the magnitude of the sum also is changed. That is, for a data band with a high sampling synthesizer clock frequency, the number of servo information samples to be summed to complete the required interval will increase. Therefore, the demodulator 130 normalizes the servo information when generating the PES. For example, as noted above, a quadrature servo pattern produces A, B, C, and D bursts, from which are generated PES difference components comprising a $PES_P$=A−B and a $PES_Q$=C−D, and from which the PES is derived. The difference values are normalized by dividing the difference of the burst pairs by the sum of the burst pairs. More particularly, the normalized $PES_P$ and $PES_Q$ values are defined by:

$$PES_P^N=(A-B)/(A+B) \text{ and } PES_Q^N=(C-D)/C+D)$$

where the superscript "N" indicates a normalized value. In the preferred embodiment, such normalization is accomplished in the microcode of the servo controller.

Figure 6:
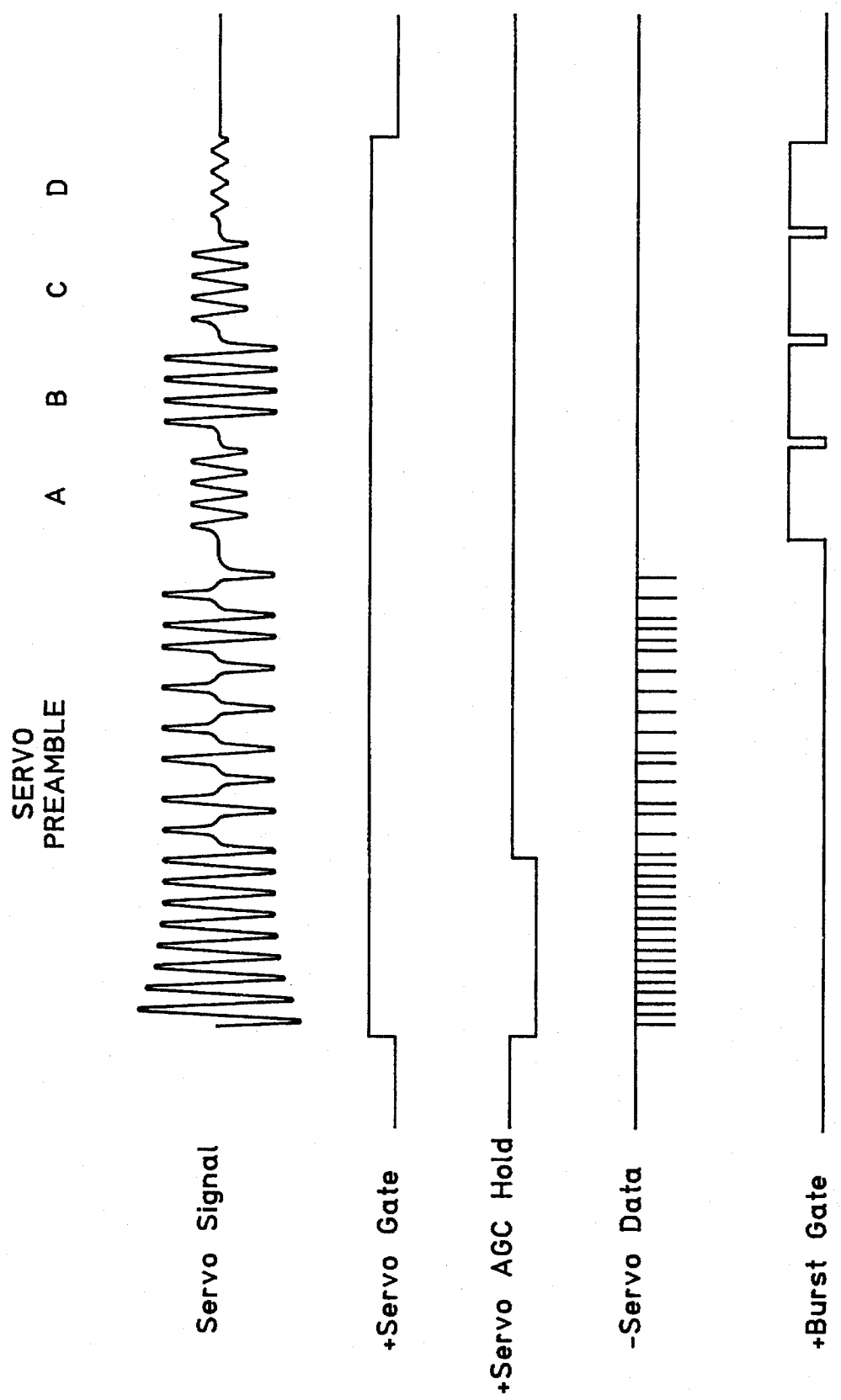
FIG. 6 is a timing diagram of signals generated by the system illustrated in FIG. 1.

FIG. 6 is a timing diagram that illustrates some of the signals generated by the elements of FIGS. 1–3. The servo signal portion of the read/write head readback signal is illustrated at the top of FIG. 6, with the A, B, C, and D portions of the servo information designated. The servo pulse detector of the channel chip (FIG. 1) generates the "−Servo Data" signal and provides it to the servo controller. FIG. 6 shows that the −Servo Data signal comprises a peak detection output for the readback signal. When the servo controller receives the −Servo Data signal and detects a predetermined pattern that corresponds to a servo synchronization field, the servo controller causes the servo pulse detector to be turned off until the end of the servo signal burst, thereby saving electrical power. The servo controller, for example, can remove power for a predetermined time equal to a known servo field interval.

FIG. 6 also shows that a "+Servo Gate" signal is high while the readback signal includes servo information. Thus, the +Servo Gate signal is low when the read/write head is over data information. The +Servo Gate signal is generated by timing logic of the servo controller in response to servo preamble information in the readback signal, as detected by checking the −Servo Data signal. The "+Burst Gate" signal also is generated by timing logic of the servo controller and initiates servo signal demodulation and information processing. Finally, the automatic gain control (AGC) element (FIG. 2) of the servo controller generates a "+Servo AGC Hold" signal for amplitude control of the signal provided to the low-pass filter.

Figure 7:
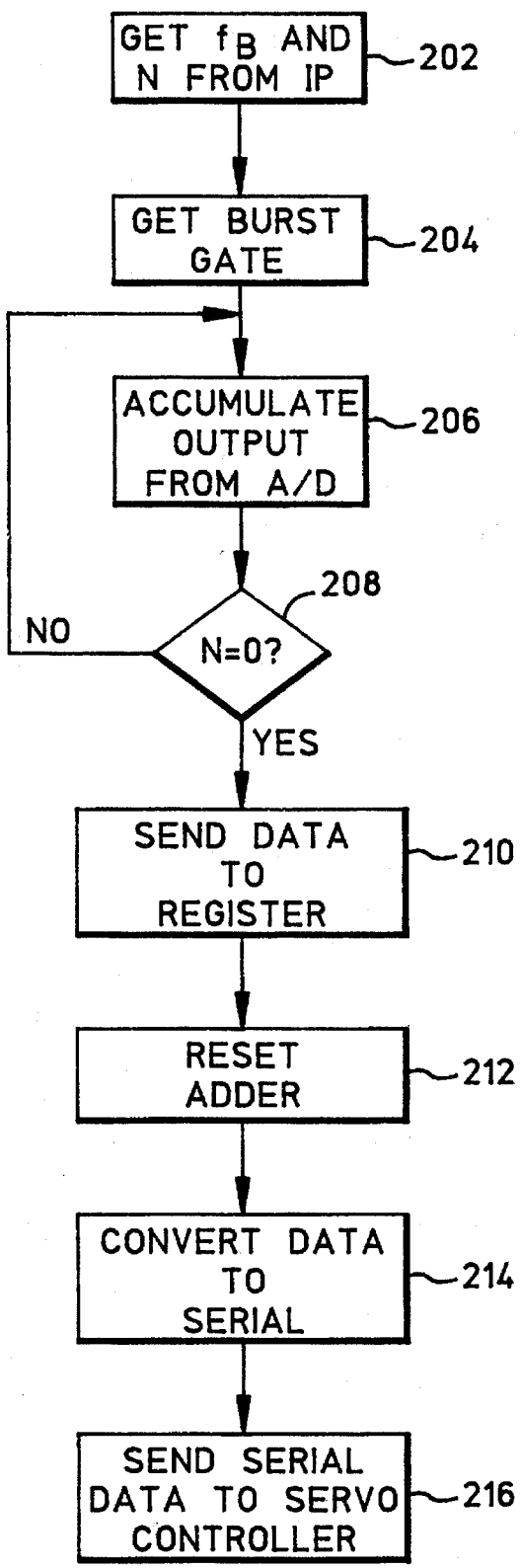
FIG. 7 is a flow diagram illustrating the operation of the servo control system illustrated in FIG. 1.
Figure 8:
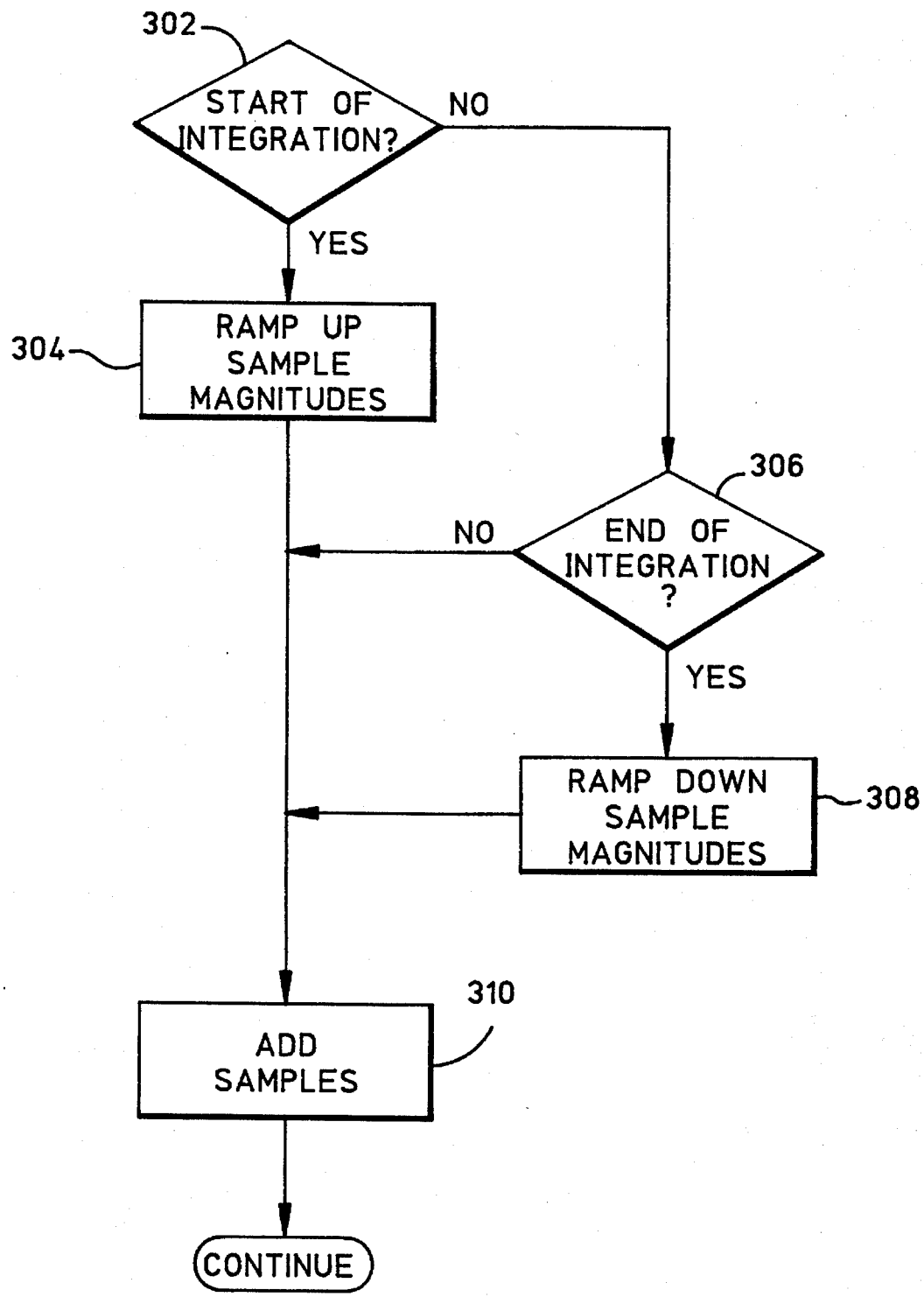
FIG. 8 is a flow diagram illustrating the integration windowing operation of the FIG. 1 system.
Figure 9:
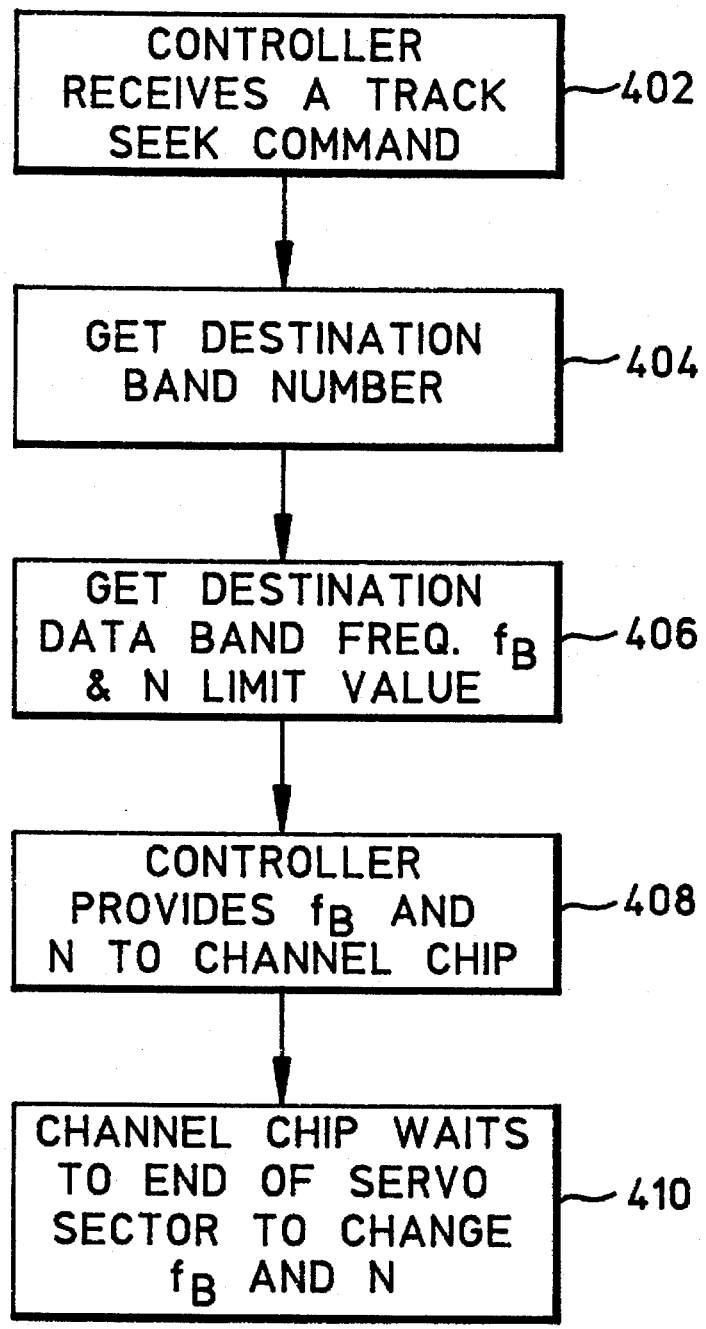
FIG. 9 is a flow diagram illustrating the operation of the FIG. 1 system in a track seek mode.

The operational sequence of steps followed by the disk drive 10 will be better understood with reference to the flow diagrams of FIGS. 7, 8, and 9. FIG. 7 illustrates the operational steps followed in demodulating the servo information. The first step, represented in FIG. 7 by the flow diagram box numbered 202, is to get the frequency for the present data band and also the number N of servo information integration samples. This information is known by the interface processor. The next step, represented by the flow diagram box numbered 204, is to receive the burst gate pulse from the servo controller, indicating the beginning of a servo pattern burst. The flow diagram box numbered 206 indicates the next step is to begin accumulating the flash A/D converter output, after rectification, in the demodulator adder. The decision box numbered 208 indicates the accumulation (summing) continues for the specified number N.

When the integration limit N has been reached, an affirmative outcome at the decision box 208, processing resumes with the latching of the adder sum to the parallel-to-serial shift register, as indicated by the flow diagram box numbered 210. Next, as indicated by the box numbered 212, is to reset the adder so it is ready for the next servo burst. The next step is to convert the shift register contents to a serial form, indicated by box 214, and finally to send the serial output to the servo controller, as indicated by box 216. The servo controller then generates the appropriate servo control signals to perform track following or a track seek operation. The processing steps represented by the flow diagram boxes numbered 206 through 214 are generally regarding as the steps involved in servo information demodulation.

The accumulation processing with the integration windowing described above, to reduce timing errors, is represented by the flow diagram boxes of FIG. 8, which represents a more detailed illustration of the accumulation processing represented by step 206 of FIG. 7. The first processing step of windowing is to check for the beginning of servo information integration, as indicated by the decision box numbered 302. If the samples are from the beginning of the integration interval, an affirmative outcome at box 302, then the next step (box 304) is to ramp up the magnitude of the samples to be summed by multiplying with the proper coefficient. If the outcome of the first processing step (box 302) was negative, indicating processing not at the beginning of the interval, then the next step is to check for the end of the integration interval, as represented by decision box 306. If the samples are from the end of the integration interval, an affirmative outcome at box 306, then the next step (box 308) is to ramp down the magnitude of the samples to be summed by multiplying with the proper coefficient. After the end samples have been ramped down, or if the samples are not from the end of the integration interval (a negative outcome at decision box 306), then the next step is to add the sample values, as indicated by the flow diagram box numbered 310. Processing resumes with the end of sampling step (box 208 of FIG. 7).

FIG. 9 represents the processing steps performed in a track seek operation. The first step, represented by the flow diagram box numbered 402, is for the disk controller to receive a track seek command. Next, as represented by box 404, is to obtain the destination data band number. Assuming that a different frequency band is involved, the next step is to obtain the sampling frequency $f_B$ and integration sampling number N, as represented by the flow diagram box numbered 406. The next processing step is for the disk controller to provide the sampling frequency and sampling number information to the channel chip, as represented by flow diagram box numbered 408. Finally, the last step is for the channel chip to wait for the end of the servo sector to change the sampling frequency and the sampling number for proper demodulation of the servo information.

Thus, a servo signal demodulator for a banded data disk drive system has been disclosed that includes a single data sampling clock for both data channel sampling and servo data sampling of the disk readback signal. The disclosed demodulator utilizes a flash analog-to-digital (A/D) converter to generate samples of the readback signal in accordance with a repeating sampling clock whose frequency changes as a function of a data band of the disk and includes an adder that sums the signal samples from the flash A/D converter and a decoder circuit that latches the adder sum and provides it to a servo controller. The demodulator then resets the adder to zero after the adder output has been latched.

The present invention has been described above in terms of a presently preferred embodiment so that an understanding of the present invention can be conveyed. There are, however, many configurations for disk drive servo demodulators not specifically described herein but with which the present invention is applicable. The present invention should therefore not be seen as limited to the particular embodiment described herein, but rather, it should be understood that the present invention has wide applicability with respect to servo demodulators generally. All modifications, variations, or equivalent arrangements that are within the scope of the attached claims should therefore be considered to be within the scope of the invention.

We claim:

1. A servo signal demodulation system comprising:

an analog-to-digital converter that sequentially receives samples of a readback signal generated by a disk read/write head positioned over a rotating disk storage medium according to a sampling clock frequency that changes as a function of a disk data band over which the read/write head is positioned;

an adder that receives rectified readback signal samples from the analog-to-digital converter and sums the rectified readback samples to produce an output comprising an integrated servo burst value;

a register that receives the summed integrated servo burst value from the adder; and a servo signal demodulation circuit that determines a sample limit number according to the sampling clock frequency and latches the adder output integrated servo burst value to the register and resets the adder to an initial value when the sample limit number of readback signal samples have been received by the adder such that the time interval over which the readback signal samples were received is maintained constant regardless of the sampling clock signal frequency for use by a disk servo controller;

wherein the servo signal demodulation circuit determines the sample limit number to maintain the sampling time interval constant for a cyclic servo burst pattern by dividing the number of servo burst pattern cycles comprising a single quadrature burst by the frequency of the servo pattern bursts and multiplying by the sampling clock frequency.

2. A servo demodulation system that produces a servo position signal for use by a servo controller of a disk drive having a read/write head that transduces a servo pattern comprising servo data bursts recorded on a disk and thereby generates an analog readback signal corresponding to the servo data bursts, the servo demodulation system comprising:

an analog-to-digital converter that sequentially receives samples of the readback signal according to a sampling clock frequency that changes as a function of a disk data band over which the read/write head is positioned;

an adder that rectifies and sums the samples to produce an integrated servo burst value for each servo data burst;

a register that receives the summed integrated servo burst value from the adder; and a servo signal demodulation circuit that latches the integrated servo burst value from the adder to the register after each servo data burst has been summed and then resets the adder sum to an initial value such that the time interval over which the readback signal samples were received by the analog-to-digital converter for each burst is maintained constant regardless of the sampling clock signal frequency, for use by the servo controller;

wherein the servo signal demodulation circuit determines the sample limit number to maintain the sampling time interval constant for a cyclic servo burst pattern by dividing the number of servo burst pattern cycles comprising a single quadrature burst by the frequency of the servo pattern bursts and multiplying by the sampling clock frequency.

3. A servo control system for controlling movement of a read/write head of a disk storage drive relative to a servo burst pattern recorded in a servo track of a moving banded data disk of the disk storage drive, the servo control system comprising:

an analog-to-digital converter that sequentially receives samples of the readback signal according to a sampling clock frequency that changes as a function of a disk data band over which the read/write head is positioned;

an adder that rectifies and sums the samples to produce an integrated servo burst value;

a register that receives the summed integrated servo burst value from the adder;

a servo signal demodulation circuit that receives a sample limit number according to the sampling clock frequency and latches the integrated servo signal value from the adder to the register when the sample limit number of readback signal samples have been received by the adder such that a time interval over which the readback signal samples for each servo burst were received is maintained constant regardless of the sampling clock signal frequency;

a servo that moves the read/write head above the moving banded data disk for reading the servo burst pattern; and a servo controller that receives an output burst signal value from the register and controls the servo such that the servo positions the read/write head substantially centered over the servo track in accordance with the output burst signal values;

wherein the servo signal demodulation circuit determines the sample limit number to maintain the sampling time interval constant for a cyclic servo burst pattern by dividing the number of servo burst pattern cycles comprising a single quadrature burst by the frequency of the servo pattern bursts and multiplying by the sampling clock frequency.

4. A data storage disk drive comprising:

a magnetic storage disk on which is recorded at least one data track containing servo data defined by a repeating sequence of magnetic transitions comprising servo bursts that define a servo pattern and containing data channel data defined by magnetic transitions comprising data values, the data channel data being recorded at a frequency that is a function of the radial distance of the data track from the center of the magnetic storage disk;

a magnetic read/write head that transduces the data contained in the data track and produces a disk analog readback signal as the disk is rotated;

a servo that moves the magnetic head relative to the surface of the magnetic storage media disk;

an analog-to-digital converter that sequentially receives samples of the readback signal according to a sampling clock frequency that changes as a function of a disk data band over which the read/write head is positioned;

an adder that rectifies and sums the samples to produce an integrated servo signal value;

a register that receives the summed integrated servo bust value from the adder; and a servo signal demodulation circuit that receives a sample limit number according to the sampling clock frequency and latches the integrated servo signal value from the adder to the register when the sample limit number of readback signal samples have been received by the adder such that the time interval over which the readback signal samples were received is maintained constant regardless of the sampling clock signal frequency, and is sufficient to comprise readback sample that define a servo burst of the servo pattern, thereby latching a series of integrated servo signal values to the register as the disk rotates;

a servo that moves the magnetic head adjacent the surface of the rotating storage media disk for reading the data track; and a servo controller that receives the servo bursts from the register to determine a position error signal and controls the servo such that the servo positions the magnetic head substantially centered over the data track;

wherein the servo signal demodulation circuit determines the sample limit number to maintain the sampling time interval constant for a cyclic servo burst pattern by dividing the number of servo burst pattern cycles comprising a single quadrature burst by the frequency of the servo pattern bursts and multiplying by the sampling clock frequency.

5. A method of demodulating a readback signal produced by a read/write head as it transduces data recorded in a data track in a surface of a data disk, wherein the data track includes both servo field data recorded at a constant frequency across the surface of the disk and data channel field data recorded at a variable frequency that is a function of the distance of the data track from the disk center, the method comprising the steps of:

determining the data channel field data recording frequency;

determining a servo field data integration sample limit number N defining an integration interval during which readback signal samples will be received;

detecting a burst gate signal indicating the beginning of a servo data field;

receiving samples of the readback signal and summing N of the samples; and providing the summed servo readback signal samples to a servo controller for controlling movement of the read/write head across the data disk;

wherein the step of determining a sample limit number N for sampling a cyclic servo burst pattern comprises setting N equal to the result of dividing the number of servo burst pattern cycles comprising a single quadrature burst by the frequency of the servo pattern bursts and multiplying by the sampling clock frequency.

* * * * *

UNITED STATES PATENT AND TRADEMARK OFFICE
CERTIFICATE OF CORRECTION

PATENT NO. : 5,602,692
DATED : February 11, 1997
INVENTOR(S) : Freitas et al

It is certified that error appears in the above-indentified patent and that said Letters Patent is hereby corrected as shown below:

Column 13, line 1, change "bust" to --burst--.

Column 13, line 11, change "sample" to --samples--.

Signed and Sealed this

Second Day of December, 1997

Attest:

Attesting Officer

BRUCE LEHMAN

Commissioner of Patents and Trademarks